(12) United States Patent
Taneichi et al.

(10) Patent No.: US 7,291,672 B2
(45) Date of Patent: Nov. 6, 2007

(54) PASTE COMPOSITION AND USES THEREOF

(75) Inventors: Daiki Taneichi, Sodegaura (JP);
Manabu Tsuruta, Sodegaura (JP);
Masahiko Mitsuduka, Sodegaura (JP)

(73) Assignee: Mitsu Takeda Chemicals, Inc., Tokyo (JP)

( * ) Notice: Subject to any disclaimer, the term of this patent is extended or adjusted under 35 U.S.C. 154(b) by 88 days.

(21) Appl. No.: 10/540,775

(22) PCT Filed: Oct. 27, 2004

(86) PCT No.: PCT/JP2004/015943

§ 371 (c)(1),
(2), (4) Date: Jun. 24, 2005

(87) PCT Pub. No.: WO2005/040280

PCT Pub. Date: May 6, 2005

(65) Prior Publication Data

US 2006/0116469 A1    Jun. 1, 2006

(30) Foreign Application Priority Data

Oct. 27, 2003  (JP) .............................. 2003-366163
Nov. 11, 2003  (JP) .............................. 2003-380969
Nov. 12, 2003  (JP) .............................. 2003-382141
Nov. 13, 2003  (JP) .............................. 2003-383240

(51) Int. Cl.
*C08J 3/00* (2006.01)
*C08K 3/00* (2006.01)
*C08K 3/18* (2006.01)
*C08K 3/40* (2006.01)
*C08L 75/00* (2006.01)

(52) U.S. Cl. .................. 524/590; 313/292; 427/64; 427/68; 427/58; 427/71; 427/126.2; 427/126.3; 428/688; 428/689; 428/690; 524/401; 524/430; 524/438; 524/589; 524/591; 524/839; 524/840; 524/492; 524/493; 524/494

(58) Field of Classification Search .................. 427/64, 427/68, 58, 71, 126.2, 126.3; 313/292; 428/688, 428/689, 690, 423.1; 524/401, 430, 438, 524/589, 590, 591, 839, 840, 492, 493, 494
See application file for complete search history.

(56) References Cited

U.S. PATENT DOCUMENTS 5,674,553 A * 10/1997 Shinoda et al. .............. 427/68
5,840,465 A    11/1998 Kakinuma et al.
6,646,093 B2  11/2003 Tsuruta et al.

FOREIGN PATENT DOCUMENTS

| EP | 1 158 019 A2 | 11/2001 |
|---|---|---|
| EP | 1 184 364 A1 | 3/2002 |
| JP | 58-134163 A | 8/1983 |
| JP | 10-36479 A | 2/1998 |
| JP | 11-246236 A | 9/1999 |
| JP | 11-343328 A | 12/1999 |
| JP | 2000-297133 A | 10/2000 |
| JP | 2000-355618 A | 12/2000 |
| JP | 2001-329256 A | 11/2001 |
| JP | 2002-255587 A | 9/2002 |
| JP | 2003-054992 A | 2/2003 |

OTHER PUBLICATIONS

Partial English translation of JP 2000-355618.

* cited by examiner

*Primary Examiner*—Patrick Niland
(74) *Attorney, Agent, or Firm*—Buchanan Ingersoll & Rooney PC

(57) ABSTRACT

The paste composition of the present invention is a paste composition comprising (i) a polyurethane resin which comprises (a) a recurring unit represented by the formula (1) and (b) a recurring unit represented by the formula (2), a molar fraction of said recurring unit (a) being in the range of 0.35 to 0.99, a molar fraction of said recurring unit (b) being in the range of 0.01 to 0.65, the total of both the molar fractions being 1, (ii) a solvent and (iii) a powder. By the use of the paste composition, dielectric layers, sealing products, barrier ribs, phosphors, etc. can be favorably formed.

16 Claims, No Drawings

PASTE COMPOSITION AND USES THEREOF

TECHNICAL FIELD

The present invention relates to paste compositions, and more particularly to paste compositions favorably used as dielectric pastes, barrier rib material pastes and phosphor pastes used for fabricating PDP (plasma display panel) and as sealing glass pastes used especially for sealing PDP (plasma display panel), cathode discharge tube, fluorescent character display tube and FED (field emission display) or sealing IC package.

Further, the present invention relates to dielectric layers, sealed products, barrier ribs and phosphors produced by the use of the paste compositions, and processes for producing them.

BACKGROUND ART

PDP (plasma display panel) is the likeliest to be chosen as a large TV display for the next generation. In "Technical Trends of PDP Materials" (written by Yasuo Katsuya, Hitachi Chemical Technical Report No. 33(7), Sep. 16, 1999), a process for fabricating PDP and major materials used in each step of the process are described in detail (non-patent document 1).

In a structure of general PDP, an electrode for plasma discharge is formed on a front side glass substrate, and on the electrode, a dielectric layer (insulator) is formed. This dielectric layer needs to have resistance to high pressure and transparency to visible light.

In a method for forming a general dielectric layer, on a front side glass substrate on which an electrode has been formed, a dielectric paste of an appropriate viscosity is uniformly applied by screen printing or by the use of a bar coater, a roll coater, a slit coater or the like, then dried to remove the solvent and fired at 500 to 600° C. to decompose a binder resin in the dielectric paste.

As the binder resin in the dielectric paste, ethyl cellulose has been exclusively used heretofore because it has excellent printing properties. However, because ethyl cellulose is a rigid resin, it has a problem in the processability such as occurrence of crazing or wrinkle in the drying step. Then, in Japanese Patent Laid-Open Publication No. 246236/1999 (patent document 1) or the like, plasticizers such as phthalic esters are added to improve processability, but the plasticizers and the solvent are different in the drying rate. Therefore, more strict temperature control is required in the drying step, and the production process becomes more complicated, that is, there is yet room for improvement.

The sealing glass paste for PDP is mainly constituted of a low-melting point glass powder, an inorganic filler, a binder resin and a solvent. In a method for sealing general PDP substrates, a sealing glass paste (also referred to as "seal-up glass paste", "seal glass paste" or "frit glass paste") is filled in a gap between a back side substrate and a front side substrate by means of screen printing or a dispenser, then dried to remove the solvent and fired at 400 to 500° C. to decompose the binder resin. As the binder resin, ethyl cellulose has been exclusively used heretofore because it has excellent viscosity properties. However, because ethyl cellulose is carbonized when it is thermally decomposed, the degree of thermal decomposition is liable to become insufficient to cause deterioration of a sealing glass, resulting in a problem of shortening of a life of PDP.

Acrylic resins having better thermal decomposability have been studied as binders, but the resulting pastes exhibit too high flowability and insufficient viscosity though the thermal decomposition properties have been improved. Then, in for example Japanese Patent Laid-Open Publication No. 255587/2002 (patent document 2), acrylic resins improved in the viscosity properties are proposed. These acrylic resins, however, have high molecular weight, and therefore, spinnability (thread forming) is brought about between a screen and a printed surface in the screen printing, so that there is yet room for improvement of the printing properties.

In PDP, a front side glass substrate and a back side glass substrate are generally provided in such a manner that they face each other, and the space between these glass substrates is divided by barrier ribs. The barrier ribs are generally formed by a process of sandblasting. In this process, a barrier rib material paste is applied onto a back side glass substrate by screen printing or by the use of a roll coater, a slit coater or the like and then dried to remove the solvent, whereby a layer of the barrier rib material having a uniform thickness is obtained. Subsequently, a dry film resist (DFR) is laminated thereon, then exposed to light and developed. Thereafter, the barrier rib material which has not been coated with the resist is removed by sandblasting to form barrier ribs at the desired places. Other processes to form barrier ribs include a process wherein barrier ribs are directly printed on the back side glass substrate by screen printing and a process wherein a barrier rib material is applied onto the whole surface of the back side glass substrate by screen printing or by the use of a roll coater, a slit coater or the like and the paste of the barrier rib material on other areas than the areas corresponding to barrier ribs is scraped out by a comb-shaped blade to form barrier ribs.

The barrier ribs thus formed are fired at 500 to 600° C. to decompose the binder resin. As the binder resin, ethyl cellulose has been exclusively used heretofore because it has excellent printing properties. However, because ethyl cellulose is rigid, it has a problem that the paste is poor in the processability such as sandblasting property unless a plasticizer is added to the paste to decrease rigidity. By the addition of the plasticizer, the processability is improved, but there resides another problem that the barrier ribs are liable to have defects such as crazing in the drying step or the firing step under the influence of the plasticizer.

In order to improve processability, use of a mixture of ethyl cellulose and a hydroxyl group-containing acrylic resin as a binder has been proposed (Japanese Patent Laid-Open Publication No. 54992/2003 (patent document 3)). However, when a mixture of two kinds of binder resins is used, there occur problems such that the preparation process of the paste becomes more complicated and the quality control of the paste becomes more complicated, so that there is yet room for improvement.

The phosphor of PDP is formed by the use of a phosphor paste mainly comprising a phosphor powder, a binder resin and a solvent. The phosphor paste is filled between ribs by screen printing or the like, then dried to remove the solvent and fired at 400 to 500° C. to decompose the binder resin. As the binder resin, ethyl cellulose has been exclusively used heretofore because it has excellent printing properties. However, because ethyl cellulose is carbonized when it is thermally decomposed, carbon remains in the phosphor to lower luminance of fluorescence.

Acrylic resins having better thermal decomposability have been studied as binders, but the resulting pastes exhibit too high flowability and insufficient printing properties. Then, in for example Japanese Patent Laid-Open Publication No. 329256/2001 (patent document 4), acrylic resins improved in the printing properties are proposed. These acrylic resins, however, have high weight-average molecular weight of 600000 to 2000000, and therefore, spinnability is brought about between a screen and a printed surface in the screen printing, so that there is yet room for improvement of the printing properties.

On the other hand, in Japanese Patent Laid-Open Publication No. 355618/2000 (patent document 5), the present inventors disclose that a polyurethane resin that is used in the present invention has excellent thermal decomposability, but this has not led to an invention of a printing paste.

In Examples C-17 to C-19 of U.S. Pat. No. 6,646,093 (patent document-6), a cement paste comprising a thickening agent made of a polyurethane resin that is used in the present invention, cement and water is disclosed. This cement paste is prepared in the light of its characteristics that retardation of setting does not substantially occur when this thickening agent is used. The cement reacts with water (hydration reaction) in the paste to harden the cement paste, so that when the cement paste is used, a firing step to harden the paste is unnecessary. Therefore, the cement paste is different from the aforesaid dielectric paste or the like at this point.

In the patent document 5 and the patent document 6, there is no description of printing properties of a paste containing the polyurethane resin, and nothing is disclosed on that a paste containing the polyurethane resin can be favorably used for printing, more specifically, if a paste containing the polyurethane resin is used, screen printing can be carried out with rarely bringing about a spinnability of the paste and a smooth print can be obtained.

Patent document 1: Japanese Patent Laid-Open Publication No. 246236/1999
Patent document 2: Japanese Patent Laid-Open Publication No. 255587/2002
Patent document 3: Japanese Patent Laid-Open Publication No. 54992/2003
Patent document 4: Japanese Patent Laid-Open Publication No. 329256/2001
Patent document 5: Japanese Patent Laid-Open Publication No. 355618/2000
Patent document 6: U.S. Pat. No. 6,646,093
Non-patent document 1: "Technical Trends of PDP Materials" (written by Yasuo Katsuya, Hitachi Chemical Technical Report No. 33(7), Sep. 16, 1999)

DISCLOSURE OF THE INVENTION

Problems to Be Solved by the Invention

It is an object of the present invention to provide a paste composition by the use of which screen printing can be carried out with rarely bringing about spinnability of the paste and a smooth print can be obtained.

It is another object of the present invention to provide a dielectric paste composition which is substitutive for a conventional paste composition using ethyl cellulose as a binder resin and is superior in the processability.

It is a further object of the present invention to provide a sealing glass paste composition which is not carbonized when fired and causes no problem of spinnability or the like in the screen printing.

It is a still further object of the present invention to provide a barrier rib material paste composition which is substitutive for a conventional paste composition using ethyl cellulose as a binder-resin and is superior in the processability.

It is a still further object of the present invention to provide a phosphor paste composition which is not carbonized when fired and causes no problem of spinnability or the like in the screen printing.

Means to Solve the Problems

The present inventors have earnestly studied to solve the above problems and found that a paste composition using as a binder resin a polyurethane resin containing a specific comb-shaped diol and a polyoxyalkylene glycol as diol components exhibits excellent printing properties. Based on the finding, the present invention has been accomplished.

That is to say, the present invention has the following features.

The paste composition of the present invention is a paste composition comprising:

(i) a polyurethane resin which comprises:

(a) a recurring unit represented by the following formula (1):

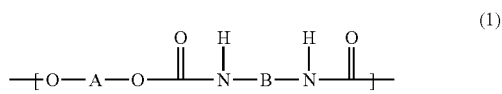

wherein A is a group (divalent group) given by removing OH groups from a polyoxyalkylene glycol (compound A) HO-A-OH having hydroxyl groups on both terminals thereof, and B is a group (divalent group) given by removing NCO groups from a diisocyanate (compound B) OCN—B—NCO, and (b) a recurring unit represented by the following formula (2):

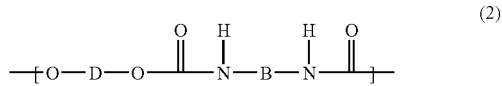

wherein D is a group (divalent group) given by removing OH groups from a comb-shaped diol HO-D-OH having at least two hydrocarbon groups (monovalent groups) of 4 to 21 carbon atoms in a molecule, and B is a group (divalent group) given by removing NCO groups from a diisocyanate (compound B) OCN—B—NCO, said polyurethane resin having a molar fraction of the recurring unit (a) from 0.35 to 0.99 and a molar fraction of the recurring unit (b) from 0.01 to 0.65, with the proviso that the total of both the molar fractions is 1, (ii) a solvent, and (iii) a powder.

As the comb-shaped diol HO-D-OH, there can be employed a comb-shaped dial (compound D) represented by the following formula (3):

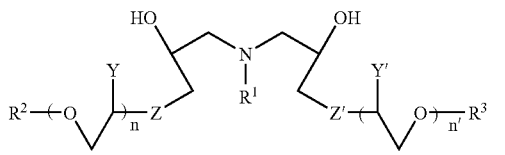

(3)

wherein $R^1$ is a hydrocarbon or nitrogen-containing hydrocarbon group of 1 to 20 carbon atoms, $R^2$ and $R^3$ are each a hydrocarbon group of 4 to 21 carbon atoms, a part or all of hydrogen atoms in $R^1$, $R^2$ and $R^3$ may be replaced with fluorine, chlorine, bromine or iodine, and $R^2$ and $R^3$ may be the same or different, Y and Y' are each hydrogen, a methyl group or a $CH_2Cl$ group, and Y and Y' may be the same or different, Z and Z' are each oxygen, sulfur or a $CH_2$ group, and Z and Z' may be the same or different, when Z is oxygen, n is an integer of 0 to 15, and when Z is sulfur or a $CH_2$ group, n is 0, and when Z' is oxygen, n' is an integer of 0 to 15, when Z' is sulfur or a $CH_2$ group, n' is 0, and n and n' may be the same or different; or a comb-shaped diol (compound D') represented by the following formula (4):

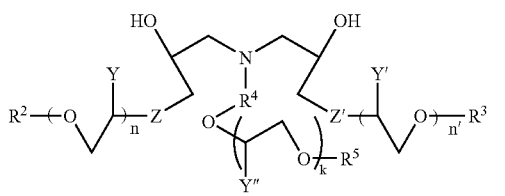

(4)

wherein $R^5$ is a hydrocarbon group of 1 to 20 carbon atoms, $R^2$ and $R^3$ are each a hydrocarbon group of 4 to 21 carbon atoms, a part or all of hydrogen atoms in $R^5$, $R^2$ and $R^3$ may be replaced with fluorine, chlorine, bromine or iodine, and $R^2$ and $R^3$ may be the same or different, Y, Y' and Y" are each hydrogen, a methyl group or a $CH_2Cl$ group, and Y and Y' may be the same or different, Z and Z' are each oxygen, sulfur or a $CH_2$ group, and Z and Z' may be the same or different, $R_4$ is an alkylene group having 2 to 4 carbon atoms in all, k is an integer of 0 to 15, when Z is oxygen, n is an integer of 0 to 15, and when Z is sulfur or a $CH_2$ group, n is 0, and when Z' is oxygen, n' is an integer of 0 to 15, when Z' is sulfur or a $CH_2$ group, n' is 0, and n and n' may be the same or different.

The powder (iii) is preferably a low-melting point glass powder or a phosphor powder.

The paste composition may further comprise an inorganic filler (except the low-melting point glass powder) as the powder (iii).

The low-melting point glass powder is preferably a dielectric glass powder, a sealing glass powder or a barrier rib material glass powder.

The dielectric layer, the sealed product, the barrier rib and the phosphor according to the present invention are each formed from the above-mentioned paste composition.

The process for producing a dielectric layer, a sealed product, a barrier rib or a phosphor according to the present invention comprises applying or printing the above-mentioned paste composition on a substrate and then firing the paste composition.

EFFECT OF THE INVENTION

By the use of the paste composition of the invention, screen printing showing favorable screen peeling between a printed surface and a screen and almost free from occurrence of a spinnability of paste can be carried out. Further, a smooth printed surface can be formed. Moreover, after firing of the printed paste composition, the amount of a residue is extremely small.

When the paste composition of the invention is used as a dielectric paste composition, there is an advantage that defects of the dielectric layer, such as crazing and wrinkle, do not occur in the drying step even if a plasticizer is not contained at all or contained in small amount.

When the paste composition of the invention is used as a sealing paste composition, there are advantages that because the paste composition is not carbonized but completely decomposed when it is fired, deterioration of a sealing glass rarely takes place, and spinnability or the like does not occur in the screen printing.

When the paste composition of the invention is used as a barrier rib material paste composition, there is an advantage that "over-sandblasting" rarely occurs in the sandblasting process. In the sandblasting process, sandblasting is performed from the above of a patterned photoresist, and only the barrier rib material paste composition from which the photoresist has been released is removed in the perpendicular direction to the coated surface of the barrier rib material paste composition. The term "over-sandblasting" means to excessively remove even a lower part of the barrier rib material paste composition from which the photoresist has not been released. Further, there is an advantage that because the barrier rib material paste composition of the invention dose not contain a plasticizer at all or contains it in small amount, defects of barrier ribs caused by the addition of a large amount of a plasticizer are not brought about in the drying step or the firing step.

When the paste composition of the invention is used as a phosphor paste composition, there are advantages that because the paste composition is not carbonized when fired, luminance of fluorescence is high, and spinnability or the like does not occur in the screen printing.

BEST MODE FOR CARRYING OUT THE INVENTION

The paste composition of the invention is described in detail hereinafter.

(i) Polyurethane Resin

The polyurethane resin (i) for use in the invention is a polyurethane resin comprising:

(a) a recurring unit represented by the following formula (1)

wherein A is a group (divalent group) given by removing OH groups from a polyoxyalkylene glycol (compound A) HO-A-OH having hydroxyl groups on both terminals thereof, and B is a group (divalent group) given by removing NCO groups from a diisocyanate (compound B) OCN—B—NCO, and (b) a recurring unit represented by the following formula (2):

wherein D is a group (divalent group) given by removing OH groups from a comb-shaped diol HO-D-OH having at least two hydrocarbon groups (monovalent groups) of 4 to 21 carbon atoms in a molecule, and B is a group (divalent group) given by removing NCO groups from a diisocyanate (compound B) OCN—B—NCO, said polyurethane resin having a molar fraction of the recurring unit (a) from 0.35 to 0.99 and a molar fraction of the recurring unit (b) from 0.01 to 0.65, with the proviso that the total of both the molar fractions is 1.

A in the recurring unit (a) represented by the formula (1) is a group (divalent group) given by removing OH groups from a water-soluble or hydrophilic polyoxyalkylene glycol (compound A) HO-A-OH. As the polyoxyalkylene glycol (compound A), a polyoxyalkylene glycol, an alkylene group of which has 2 to 6 carbon atoms, is particularly preferably-employed. Examples of such polyoxyalkylene glycols include polyethylene glycol (PEG), polypropylene glycol (PPG), polytetramethylene ether glycol (PTMEG), polyhexamethylene ether glycol and an adduct of PPG with ethylene oxide.

The compound A has a number-average molecular weight (Mn) of preferably 400 to 100,000, more preferably 400 to 20,000, still more preferably 900 to 9,000. When the number-average molecular weight is not less than 400, a polyurethane resin (i) having a weight-average molecular weight enough to obtain a uniform printed surface can be obtained. When the number-average molecular weight is not more than 100,000, satisfactory polymerization reaction can be carried out, and a resin substantially free from occurrence of spinnability is obtained.

As the polyoxyalkylene glycol (compound A), two or more kinds of polyoxyalkylene glycols may be used in combination. For example, polyethylene glycol and polypropylene glycol or polytetramethylene ether glycol can be used in combination.

As the compound (A), instead of the polyoxyalkylene glycol, a low-molecular weight glycol, such as ethylene glycol, diethylene glycol, propylene glycol, dipropylene glycol, tetramethylene glycol or hexamethylene glycol, may be used in combination provided that the amount thereof is not more than 20% by weight of the total weight of the compound (A).

D in the recurring unit (b) represented by the formula (2) is a group (divalent group) given by removing OH groups from a comb-shaped diol HO-D-OH (compound D). The comb-shaped diol HO-D-OH is a diol having at least two monovalent hydrocarbon groups of 4 to 21 carbon atoms in a molecule. A plural number of the monovalent hydrocarbon groups are grafted as side chains on a skeleton of the diol molecule, and from this shape, the compound D is referred to as a "comb-shaped diol".

Examples of the monovalent hydrocarbon groups include an alkyl group, an alkenyl group, an aralkyl group and an aryl group.

The monovalent hydrocarbon groups are bonded to the skeleton of the comb-shaped diol through a methylene group, an ether group, a thioether group, a polyether group or the like.

Although the skeleton of the comb-shaped diol may be constituted of only hydrocarbons, a comb-shaped diol having a polar group, such as an ether group (—O—), a polyether group or a tertiary amino group (—N(R)—), in its skeleton is also preferably employed.

As the comb-shaped diol, such a diol having a tertiary amino group in its skeleton as represented by the aforesaid formula (3) or (4) is employable.

It is thought that since the monovalent hydrocarbon groups in the comb-shaped diol have low polarity, they mutually act on each other in a polar solvent to cause hydrophobic interaction between polymer chains of polyurethane, and therefore, even polyurethane having a relatively low molecular weight can obtain viscosity necessary for printing.

In general, a paste composition containing a solution of a polymer having a weight-average molecular weight of more than 1,000,000 is liable to cause spinnability between a surface of the paste and a screen, a bar coater, a roll coater or the like in a screen printing step or a coating step using a bar coater, a roll coater or the like, and the surface of the paste prepared using such a polymer solution has a problem of lowering of smoothness. Especially in case of screen printing, screen peeling between the screen and the printed surface is impaired because of spinnability, whereby printing cannot be carried out occasionally. The term "screen release peel" used herein means a phenomenon that a screen naturally separates from the printed surface by virtue of a tension of the screen. Also in case of coating using a dispenser, spinnability takes place between a tip of the dispenser and the paste, and therefore, processing accuracy is lowered.

In the paste composition, polymer chains are entangled with one another in the polymer solution to develop viscosity, and this entanglement among the polymer chains is considered as a cause of the spinnability. In order to develop viscosity necessary for processing such as printing by the entanglement, the polymer generally needs to have a weight-average molecular weight of not less than 500,000, more preferably not less than 1,000,000.

On the other hand, in the paste composition of the invention, the polymer solution is thickened by association of polymer chains with one another in the solution due to the hydrophobic interaction in the comb-shaped diol even if the polymer chains of the polyurethane resin (i) are not entangled. Consequently, even if the weight-average molecular weight of the polyurethane resin (i) is not more than 1,000,000, viscosity necessary for processing such as printing can be imparted to the paste composition, and hence, a problem of spinnability does not take place.

Further, the comb-shaped diol is considered to function as a plasticizer (internal plasticizer) fixed within the polymer skeleton of the polyurethane.

The process for preparing the comb-shaped diol is described in detail in Japanese Patent Laid-Open Publication No. 343328/1999, Japanese Patent Laid-Open Publication No. 297133/2000, etc.

In the recurring unit (a) represented by the formula (1) and in the recurring unit (b) represented by the formula (2), B is a group (divalent group) given by removing NCO groups from a diisocyanate (compound B) OCN—B—NCO.

The diisocyanate compound (compound B) is a diisocyanate compound selected from the group consisting of chain aliphatic diisocyanates, cyclic aliphatic diisocyanates and aromatic diisocyanates.

It is more preferable to use diisocyanates having 3 to 18 carbon atoms in all (including carbon atoms of NCO groups) as the diisocyanate compound (compound B).

The chain aliphatic diisocyanates are polyisocyanate compounds having a structure wherein NCO groups are linked by a straight-chain or branched chain alkylene group, and examples of such compounds include methylene diisocyanate, ethylene diisocyanate, trimethylene diisocyanate, 1-methylethylene diisocyanate, tetramethylene diisocyanate, pentamethylene diisocyanate, 2-methylbutane-1,4-diisocyanate, hexamethylene diisocyanate (abbreviated to HMDI (popular name)), heptamethylene diisocyanate, 2,2'-dimethylpentane-1,5-diisocyanate, lysine diisocyanate methyl ester (abbreviated to LDI (popular name)), octamethylene diisocyanate, 2,5-dimethylhexane-1,6-diisocyanate, 2,2,4-trimethylpentane-1,5-diisocyanate, nonamethyl diisocyanate, 2,4,4-trimethylhexane-1,6-diisocyanate, decamethylene diisocyanate, undecamethylene diisocyanate, dodecamethylene diisocyanate, tridecamethylene diisocyanate, tetradecamethylene diisocyanate, pentadecamethylene diisocyanate, hexadecamethylene diisocyanate and trimethylhexamethylene diisocyanate.

The cyclic aliphatic diisocyanates are polyisocyanate compounds wherein an alkylene group to link NCO groups has a cyclic structure, and examples of such compounds include cyclohexane-1,2-diisocyanate, cyclohexane-1,3-diisocyanate, cyclohexane-1,4-diisocyanate, 1-methylcyclohexane-2,4-diisocyanate, 1-methylcyclohexane-2,6-diisocyanate, 1-ethylcyclohexane-2,4-diisocyanate, 4,5-dimethylcyclohexane-1,3-diisocyanate, 1,2-dimethylcyclohexane-ω,ω'-diisocyanate, 1,4-dimethylcyclohexane-ω,ω'-diisocyanate, isophorone diisocyanate (abbreviated to IPDI (popular name)), dicyclohexylmethane-4,4'-diisocyanate, dicylohexylmethylmethane-4,4-diisocyanate, dicyclohexyldimethylmethane-4,4'-diisocyanate, 2,2'-dimethyldicylohexylmethane-4,4'-diisocyanate, 3,3'-dimethyldicylohexylmethane-4,4'-diisocyanate, 4,4'-methylene-bis(isocyanatocyclohexane), isopropylidenebis(4-cyclohexyl isocyanate) (abbreviated to IPCI (popular name)), 1,3-bis(isocyanatomethyl)cyclohexane, hydrogenated tolylene diisocyanate (abbreviated to H-TDI (popular name)), hydrogenated 4,4'-diphenylmethane diisocyanate (abbreviated to H-MDI (popular name)), hydrogenated xylylene diisocyanate (abbreviated to H-XDI (popular name)) and norbornane diisocyanate (abbreviated to NBDI (popular name)).

The aromatic diisocyanates are polyisocyanate compounds wherein NCO groups are linked by an aromatic group, such as a phenylene group, an alkyl-substituted phenylene group or an aralkylene group, or a hydrocarbon group containing an aromatic group, and examples of such compounds include 1,3- or 1,4-phenylene diisocyanate, 1-methyl-2,4-phenylene diisocyanate (2,4-TDI), 1-methyl-2,6-phenylene diisocyanate (2,6-TDI), 1-methyl-2,5-phenylene diisocyanate, 1-methyl-3,5-phenylene diisocyanate, 1-ethyl-2,4-phenylene diisocyanate, 1-isopropyl-2,4-phenylene diisocyanate, 1,3-dimethyl-2,4-phenylene diisocyanate, 1,3-dimethyl-4,6-phenylene diisocyanate, 1,4-dimethyl-2,5-phenylene diisocyanate, m-xylene diisocyanate, diethylbenzene diisocyanate, diisopropylbenzene diisocyanate, 1-methyl-3,5-diethylbenzene-2,4-diisocyanate, 3-methyl-1,5-diethylbenzene-2,4-diisocyanate, 1,3,5-triethylbenzene-2,4-diisocyanate, naphthalene-1,4-diisocyanate, naphthalene-1,5-diisocyanate, 1-methylnaphthalene-1,5-diisocyanate, naphthalene-2',6-diisocyanate, naphthalene-2,7-diisocyanate, 1,1-dinaphthyl-2,2'-diisocyanate, biphenyl-2,4'-diisocyanate, biphenyl-4,4'-diisocyanate, 1,3-bis(1-isocyanato-1-methylethyl)benzene, 3,3'-dimethylbiphenyl-4,4'-diisocyanate, diphenylmethane-4,4'-diisocyanate (MDI), diphenylmethane-2,2'-diisocyanate, diphenylmethane-2,4'-diisocyanate and xylylene diisocyanate (XDI).

The polyurethane resin (i) can be properly prepared by referring to preparation processes described in detail in Japanese Patent Laid-Open Publication No. 343328/1999, Japanese Patent Laid-Open Publication No. 297133/2000, etc.

(ii) Solvent

The solvent (ii) for use in the invention is not specifically restricted, and any of solvents capable of dissolving the polyurethane resin (i) used as a binder resin can be preferably employed. Examples of the solvents (ii) include N-methylpyrrolidone, dimethylformamide, dimethyl sulfoxide, benzyl alcohol, terpineol, ethyl acetate, butyl acetate, butylcarbitol acetate, butyl carbitol, toluene, xylene, tetrahydrofuran, methanol, ethanol, isopropanol, butanol, water and mixtures of these solvents. A solvent having large polarity is particularly preferably employed.

(iii) Powder

The powder (iii) for use in the invention can be properly selected according to the use purpose of the paste composition of the invention. The powder (iii) is, for example, a low-melting point glass powder or a phosphor powder. The low-melting point glass means a glass that is capable of fusion bonding at a temperature at which a plate glass does not undergo thermal deformation or a glass that is capable of fusion bonding at a temperature lower than a heat-resisting temperature of a plate glass. The low-melting point glass has Tg of not higher than 600° C., preferably not higher than 400° C., more preferably not higher than 350° C. and not lower than 250° C. Such a low-melting point glass is generally used as a sealing glass, a seal glass, a solder glass or the like. The powder (iii) has a maximum particle diameter (Dmax) of not more than 100 µm, more preferably 1 to 50 µm. When the maximum particle diameter is not more than 100 µm, screen printing or the like can be sufficiently carried out using the resulting paste composition.

In the case where the paste composition of the invention is used as, for example, a dielectric paste composition, a dielectric glass powder and if necessary an inorganic filler are used as the powder (iii).

The dielectric glass powder is not specifically restricted provided that it is a powder of the above-mentioned low-melting point glass, and any of dielectric glass powders used for PDP can be favorably employed. The dielectric glass is a glass that is used for forming a dielectric layer of PDP and is a glass capable of forming a film free from defects and showing high withstand voltage properties at a firing temperature (usually 400 to 600° C., preferably 530 to 580° C.) of the dielectric layer. The dielectric glass has Tg of usually not higher than 600° C. and not lower than 300° C., preferably not higher than 500° C. and not lower than 390° C. Examples of the dielectric glasses preferably used include a $PbO-B_2O_3-SiO_2$ glass, a $PbO-B_2O_3-SiO_2-ZnO-CaO$ glass, a $PbO-B_2O_3-SiO_2-ZnO-BaO-CaO-Bi_2O_3$ glass and a $ZnO-Bi_2O_3-B_2O_3-SiO_2-CaO-SrO-BaO$ glass.

Although the inorganic filler does not necessarily have to be used, it can be added in a proper amount to control flowability or thermal expansion coefficient of the paste. The type of the inorganic filler is not specifically restricted, and any of dielectric fillers used for PDP can be favorably employed. For example, alumina, α-quartz, titania and zirconia are employable.

In the case where the paste composition of the invention is used as a sealing glass paste composition, a sealing glass powder and if necessary an inorganic filler are used as the powder (iii). The sealing glass is also called a seal-up glass, a seal glass or a frit glass. This glass is a glass to finally seal openings of PDP, FED, cathode-ray tubes, etc. and is, from the viewpoint of properties, a glass capable of sealing at a sealing temperature (e.g., 410 to 480° C.). The sealing glass has Tg of usually not higher than 400° C., preferably not higher than 350° C., more preferably not higher than 330° C. and not lower than 250° C.

Examples of the sealing glasses preferably used include a $B_2O_3-PbO$ glass, a $B_2O_3-PbO-SiO$ glass, a $B_2O_3-PbO-ZnO$ glass, a $Cu_2O-P_2O_5$ glass, a $P_2O_5-SnO$ glass, a $P_2O_5-SnO-B_2O_3$ glass and a $PbO-B_2O_3$ glass. Particular examples thereof include frit glasses. AFS1304M, ASF1200M and IWF2300M (available from Asahi Glass Co., LTD.).

To the paste, the aforesaid inorganic filler can be added for the purpose of controlling thermal expansion coefficient, when needed. The inorganic filler is not specifically restricted, and any of inorganic fillers used for a sealing glass paste composition can be favorably employed. For example, cordierite, zircon, tin oxide, niobium oxide, zirconium phosphate, willemite and mullite are preferably employed.

In the case where the paste composition of the invention is used as a barrier rib material paste composition, a glass powder and an inorganic filler (alumina, quartz or the like) other than the glass powder are used as the powder (iii).

The glass powder is not specifically restricted provided that it is the aforesaid low-melting point glass powder, and any of barrier rib material glass powders used for PDP can be favorably employed. The glass powder used as the powder (iii) in the barrier rib material paste composition is also referred to as a "barrier rib material glass" hereinafter. The barrier rib material glass has a softening point of not lower than 450° C. and not higher than 650° C. The barrier rib material glass preferably has a thermal expansion coefficient of about $60 \times 10^{-7}$ to $90 \times 10^{-7}$ (1/° C.). The barrier rib material glass preferably has an average particle diameter (D50) of 1 to 7 μm and a maximum particle diameter (Dmax) of 5 to 30 μm. Examples of the barrier rib material glasses preferably used include a $PbO-B_2O_3-SiO_2$ glass, a $BaO-ZnO-B_2O_3-SiO_2$ glass and a $ZnO-Bi_2O_3-B_2O_3-SiO_2$ glass.

The inorganic filler other than the glass is not specifically restricted either, and any of fillers for barrier rib materials used for PDP can be favorably employed. For example, alumina, α-quartz, titania and zirconia are employable.

In the case where the paste composition of the invention is used as a phosphor paste composition, a phosphor powder is used as the powder (iii).

The phosphor powder is not specifically restricted, and any of phosphor powders used for PDP can be favorably employed. Examples of the phosphor powders preferably used include $BaMgAl_{14}O_{24}$:Eu, $BaMgAl_{10}O_{17}$:Eu and $SrMg(SiO_4)_2$:Eu as blue phosphors; $(Y,Gd)BO_3$:Eu, $Y_2O_3$:Eu, $Y(P,V)O_4$:Eu and $(Y,Gd)_2O_3$:Eu as red phosphors; and $Zn_2SiO_4$:Mn, $BaAl_{12}O_{19}$:Mn and $YBO_3$:Tb as green phosphors.

The paste composition of the invention may further contain a plasticizer, a dispersant, an anti-foaming agent, etc. in addition to the polyurethane resin (i), the solvent (ii) and the powder (iii).

Paste Composition

In 100% by weight of the paste composition of the invention, the powder (iii) is contained in an amount of 30 to 95% by weight, and a binder resin solution consisting of the polyurethane resin (i) and the solvent (ii) is contained in an amount of 5 to 70% by weight.

In 100% by weight of the binder resin solution, the polyurethane resin (i) is contained in an-amount of 1 to 30% by weight, and the solvent (ii) is contained in an amount of 70 to 99% by weight, with the proviso that the total weight of the binder resin and the solvent is 100% by weight. The binder resin solution has a viscosity at 20° C. of usually 20 to 50 Pa·s.

The paste composition of the invention uses, as a binder resin, the polyurethane resin (i) that is a thermoplastic polyurethane resin having a weight-average molecular weight of 10,000 to 1,000,000, more preferably 50,000 to 500,000.

When the weight-average molecular weight of the polyurethane resin (i) is not less than 10,000, viscosity of the paste can be increased. When the weight-average molecular weight thereof is not more than 1,000,000, spinnability of the paste rarely takes place in the screen printing. When the weight-average molecular weight is in the range of 50,000 to 500,000, most excellent printing properties are exhibited.

The viscosity of the paste composition is as follows. When the paste composition is a dielectric paste composition using a dielectric glass as the powder (iii), a sealing glass paste composition using a sealing glass as the powder (iii) or a barrier rib material paste composition using a barrier rib glass as the powder (iii), the viscosity at 20° C. is in the range of usually 1 to 1000 Pa·s, more preferably 5 to 50 Pa·s. When the paste composition is a phosphor paste composition using a phosphor powder as the powder (iii), the viscosity at 20° C. is in the range of usually 1 to 1000 Pa·s, more preferably 10 to 150 Pa·s. By virtue of the viscosity in this range, the paste composition of the invention can be favorably used for printing such as screen printing.

By the use of the paste composition of the invention, pattern formation is also feasible.

The paste composition of the invention is an unreactive paste composition, namely, a paste composition in which the polyurethane resin (i), the solvent (ii) and the powder (iii) constituting the paste composition do not substantially undergo chemical reaction with each other.

The process for preparing the paste composition of the invention is not specifically restricted. For example, in a separable flask, the solvent (ii) and the polyurethane resin (i) are placed, and they are stirred for about 1 hour with heating to about 40 to 80° C. to obtain a binder resin solution. The binder resin solution, the powder (iii) and a filler are kneaded by a three-roll mill or the like, whereby the paste composition can be obtained.

Dielectric Paste Composition

In the case where the paste composition of the invention is used as a dielectric paste composition, the dielectric glass powder is contained in an amount of 40 to 80% by weight, the inorganic filler (alumina, quartz or the like) other than the dielectric glass is contained in an amount of 0 to 10% by weight, and the binder resin solution is contained in an amount of 20 to 60% by weight, in 100% by weight of the dielectric paste composition.

If the amount of the dielectric glass powder is less than 40% by weight, sufficient insulating properties and transparency are not obtained in some cases. If the amount of the dielectric glass powder exceeds 80% by weight, flowability of the paste is lowered, and uniform coating sometimes becomes difficult.

It is more preferable that the amount of the dielectric glass powder is in the range of 55 to 65% by weight, the amount of the inorganic filler (alumina, quartz or the like) other than the dielectric glass is in the range of 0 to 5% by weight, and the amount of the binder resin solution is in the range of 35 to 45% by weight, in 100% by weight of the paste composition.

In 100% by weight of the binder resin solution, the binder resin is contained in an amount of 1 to 30% by weight and the solvent is contained in an amount of 70 to 99% by weight, with the proviso that the total weight of the binder resin and the solvent is 100% by weight.

As the binder resin, the aforesaid polyurethane resin (i) that is a thermoplastic polyurethane resin having a weight-average molecular weight of 10,000 to 1,000,000, more preferably 50,000 to 500,000, is employed.

When the weight-average molecular weight of the polyurethane resin (i) is not less than 10,000, viscosity of the paste can be increased. When the weight-average molecular weight thereof is not more than 1,000,000, spinnability of the paste rarely takes place in the screen printing. When the weight-average molecular weight is in the range of 50,000 to 500,000, most excellent printing properties are exhibited.

In the case where the paste composition of the invention is used as a dielectric paste composition, the preparation process of the paste composition is not specifically restricted. For example, in a separable flask, the solvent (ii) and the polyurethane resin (i) are placed, and they are stirred for about 1 hour with heating to about 40 to 80° C. to obtain a binder resin solution. The binder resin solution, the dielectric glass powder and the filler are kneaded by a three-roll mill or the like, whereby the dielectric paste composition can be obtained.

Sealing Glass Paste Composition

In the case where the paste composition of the invention is used as a sealing glass paste composition, the sealing glass powder is contained in an amount of 35 to 95% by weight, the inorganic filler is contained in an amount of 0 to 50% by weight, and the binder resin solution is contained in an amount of 5 to 30% by weight, in 100% by weight of the sealing glass paste composition.

In the binder resin solution, the binder resin is contained in an amount of 1 to 30% by weight and the solvent is contained in an amount of 70 to 99% by weight, with the proviso that the total weight of the binder resin and the solvent is 100% by weight.

If the amount of the sealing glass powder is less than 30% by weight, many defects occur in the sealed product, and sealing sometimes becomes insufficient. If the amount of the sealing glass powder exceeds 95% by weight, flowability of the paste is sometimes lowered and thereby processing becomes difficult.

As the binder resin, the aforesaid polyurethane resin (i) that is a thermoplastic polyurethane resin having a weight-average molecular weight of 10,000 to 1,000,000, more preferably 50,000 to 500,000, is employed.

When the weight-average molecular weight of the polyurethane resin (i) is not less than 10,000, viscosity of the paste can be increased. When the weight-average molecular weight thereof is not more than 1,000,000, spinnability of the paste rarely takes place in the screen printing. When the weight-average molecular weight is in the range of 50,000 to 500,000, most excellent printing properties are exhibited.

In the case where the paste composition of the invention is used as a sealing glass paste composition, the preparation process of the paste composition is not specifically restricted. For example, in a separable flask, the solvent (ii) and the polyurethane resin (i) are placed, and they are stirred for about 1 hour with heating to about 40 to 80° C. to obtain a binder resin solution. The binder resin solution, the sealing glass powder and the filler are kneaded by a three-roll mill or the like, whereby the sealing glass paste composition can be obtained.

Barrier Rib Material Paste Composition

In the case where the paste composition of the invention is used as a barrier rib material paste composition, the barrier rib material glass powder is contained in an amount of 30 to 80% by weight, the inorganic filler (alumina, quartz or the like) other than the barrier rib material glass powder is contained in an amount of 1 to 40% by weight, and the binder resin solution is contained in an amount of 5 to 30% by weight, in 100% by weight of the barrier rib material paste composition.

In 100% by weight of the binder resin solution, the binder resin is contained in an amount of 1 to 30% by weight and the solvent is contained in an amount of 70 to 99% by weight, with the proviso that the total weight of the binder resin and the solvent is 100% by weight.

As the binder resin, the aforesaid polyurethane resin (i) that is a thermoplastic polyurethane resin having a weight-average molecular weight of 10,000 to 1,000,000, more preferably 50,000 to 500,000, is employed.

When the weight-average molecular weight of the polyurethane resin (i) is not less than 10,000, viscosity of the paste can be increased. When the weight-average molecular weight thereof is not more than 1,000,000, spinnability of the paste rarely takes place in the screen printing. When the weight-average molecular weight is in the range of 50,000 to 500,000, most excellent printing properties are exhibited.

In the case where the paste composition of the invention is used as a barrier rib material paste composition, the preparation process of the paste composition is not specifically restricted. For example, in a separable flask, the solvent (ii) and the polyurethane resin (i) are placed, and they are stirred for about 1 hour with heating to about 40 to 80° C. to obtain a binder resin solution. The binder resin solution, the glass powder and the filler are kneaded by a three-roll mill or the like, whereby the barrier rib material paste composition can be obtained.

Phosphor Paste Composition

In the case where the paste composition of the invention is used as a phosphor paste composition, the phosphor powder is contained in an amount of 30 to 70% by weight, and the binder resin solution is contained in an amount of 30 to 70% by weight, in 100% by weight of the phosphor paste composition.

In the binder resin solution, the binder resin is contained in an amount of 2 to 20% by weight and the solvent is contained in an amount of 80 to 98% by weight, with the proviso that the total weight of the binder resin and the solvent is 100% by weight.

As the binder resin, the aforesaid polyurethane resin (i) that is a thermoplastic polyurethane resin having a weight-average molecular weight of 10,000 to 1,000,000, more preferably 50,000 to 500,000, still more preferably 100,000 to 500,000, is employed.

When the weight-average molecular weight of the polyurethane resin (i) is not less than 1,000, viscosity of the paste can be increased. When the weight-average molecular weight thereof is not more than 1,000,000, spinnability of the paste rarely takes place in the screen printing. When the weight-average molecular weight is in the range of 100,000 to 500,000, most excellent printing properties are exhibited.

In the case where the paste composition of the invention is used as a phosphor paste composition, the preparation process of the paste composition is not specifically restricted. For example, in a separable flask, the solvent (ii) and the polyurethane resin (i) are placed, and they are stirred for about 1 hour with heating to about 40 to 80° C. to obtain a binder resin solution. The binder resin solution and the phosphor powder are kneaded by a three-roll mill or the like, whereby the phosphor paste composition can be obtained.

Dielectric Layer and Process for Producing the Same

The dielectric layer of the invention can be produced by applying or printing the paste composition of the invention containing the dielectric glass powder on a substrate and then firing the paste composition. More specifically, the dielectric layer can be produced by, for example, the following process.

On the whole surface of a back side glass substrate on which an electrode has been formed, the paste composition of the invention prepared as a dielectric paste composition is applied using a screen printing machine, an applicator, a bar coater, a roll coater or the like, and then the paste composition is dried to remove the solvent. An appropriate thickness is in the range of 30 to 500 μm. After the paste composition is dried at 80 to 150° C. by a hot-air dryer or the like to remove the solvent, it is fired at 500 to 600° C. for 5 to 15 minutes to form a dielectric layer having a thickness of about 20 to 100 μm.

Sealed Product and Process for Producing the Same

Method for Sealing PDP Substrates

The sealed product of the invention can be produced by applying or printing the paste composition of the invention containing the sealing glass powder on a substrate and then firing the paste composition. More specifically, the sealed product can be produced by, for example, the following process.

The paste composition prepared as a sealing glass paste composition is filled in a gap between a back side glass substrate and a front side glass substrate for PDP using a screen printing machine, a dispenser or the like. The paste composition is dried to remove the solvent and then fired at 400 to 500° C. to decompose the binder resin and thereby seal the substrates for PDP. Thus, a sealed product of the invention is formed between the substrates for PDP. Firing can be carried out in air or in nitrogen. Thereafter, a low-pressure Xe-containing Ne gas or the like is enclosed to fabricate PDP.

Barrier Rib and Process for Producing the Same

The barrier rib of the invention can be produced by applying or printing the paste composition of the invention containing the barrier rib material glass powder on a substrate and then firing the paste composition. More specifically, the barrier rib can be produced by, for example, the following process.

For forming barrier ribs using the paste composition of the invention, there are some processes, and (a) a process comprising sandblasting is described below. On the whole surface of a glass back side substrate on which an electrode and a dielectric layer have been formed, the paste composition of the invention prepared as a barrier rib material paste composition is applied, and the paste composition is dried to remove the solvent. An appropriate thickness is in the range of 50 to 200 μm. On the layer of the paste composition, a dry film resist is laminated, followed by pattern exposure and development. Then, unnecessary portions are removed by sandblasting, and the residual portions are fired at 500 to 600° C. to form barrier ribs on the glass substrate.

Other processes for forming barrier ribs include (b) a process comprising repeating screen printing plural times to directly form a pattern of barrier ribs on a substrate and (c) a process comprising applying a barrier rib material on the whole surface of a substrate by screen printing or the like and removing an excess barrier rib material by a comb-shaped blade to form a pattern of barrier ribs. The paste composition of the invention can be used also in other barrier rib-forming processes than the process comprising sandblasting.

Phosphor and Process for Producing the Same

Process for Producing Back Side Plate Member for PDP

The phosphor of the invention can be produced by applying or printing the paste composition of the invention containing the phosphor powder on a substrate and then firing the paste composition. More specifically, the phosphor can be produced by, for example, the following process.

The paste composition of the invention prepared as a phosphor paste composition is filled between barrier ribs having been formed on a back side glass substrate for PDP using a screen printing machine, a dispenser or the like. The paste composition is dried to remove the solvent and then fired at 400 to 500° C. to decompose the binder resin and thereby produce a back side plate member for PDP. Thus, a phosphor of the invention is formed.

Thereafter, a front side glass substrate separately prepared and the back side plate member are sealed with a sealing material (low-melting point glass), and a low-pressure Xe-containing Ne gas is enclosed to fabricate PDP.

EXAMPLES

The present invention is further described with reference to the following examples, but it should be construed that the invention is in no way limited to those examples.

Dielectric Glass Paste Composition

Example A1

Synthesis of Comb-Shaped Diol (1)

A 500 ml round flask was equipped with a magnetic stirrer, a thermometer and a dropping funnel. In the flask, 64.6 g of 2-ethylhexylamine (available from Kanto Kagaku) was placed, and the flask was purged with nitrogen. The flask was heated to 60° C. in an oil bath, and 220.0 g of 2-ethylhexyl glycidyl ether (available from Asahi Denka Co., Ltd., Adeka Glycirol ED518, epoxy number: 220) was dropwise added through the dropping funnel over a period of 40 minutes with stirring. After the dropwise addition was completed, the temperature of the oil bath was raised to 80° C., and the flask was heated for 10 hours. Subsequently, the temperature of the oil bath was raised to 120° C., and a small amount of the unreacted substance was removed by vacuum distillation using a vacuum pump at a degree of vacuum of 3 mmHg. Thus, a comb-shaped diol (1) (average molecular weight obtained from OH value: 532) wherein 2-ethylhexyl glycidyl ether was added in a ratio of 2 mol based on 1 mol of 2-ethylhexylamine was obtained in a yield of 90%.

Synthesis of Polyurethane Resin (1)

In a 1000 ml SUS separable flask, 200 g of commercial PEG #6000 (available from Sanyo Chemical Industries, Ltd., number-average molecular weight: 8,630) was placed, and it was melted at 150° C. under purge with nitrogen. With stirring, the melt was dried for 3 hours under reduced pressure (3 mmHg). The water content remaining was 200 ppm. The temperature was lowered down to 70° C., and the flask was filled with nitrogen at 1 atom. As an antioxidant, BHT (di-tert-butylhydroxytoluene) was added in an amount of 300 ppm. With stirring the contents in the flask, 1.90 g of the comb-shaped diol (1) and 4.41 g of hexamethylene diisocyanate (available from Tokyo Kasei-Kogyo Co., Ltd.) were placed in the flask (NCO/OH=0.98 mol/mol). As a catalyst, DBTDL was added in an amount of 0.05 g, and as a result, the contents in the flask were rapidly thickened in about 10 minutes. Then, stirring was stopped, and reaction was performed at 70° C. for 2 hours. The temperature was raised to 120° C. and kept constant for 30 minutes. Then, the reaction product was taken out of the flask. The product had a weight-average molecular weight of 470,000.

The product thus taken out was cut into small chips and then allowed to cool. The chips were cooled with liquid nitrogen and pulverized by a small impact electric mill. The pulverizate was sieved to obtain a powder having particle diameters of not more than 600 μm as a polyurethane resin (1). The powder had an average particle diameter of 400 μm.

Preparation of Binder Resin Solution (1)

In a 200 ml glass separable flask, 10 g of the polyurethane resin (1) and 90 g of N-methylpyrrolidone (available from Kanto Kagaku) as a solvent were placed, and they were stirred for 1 hour with heating to 60° C. to dissolve the resin in the solvent. Thus, a binder resin solution (1) was obtained.

Preparation of Dielectric Paste Composition (1)

To 35 g of the binder resin solution, 65 g of a dielectric glass powder ($PbO$—$B_2O_3$—$SiO_2$—$CaO$ glass) was added, and they were kneaded by a three-roll mill to obtain a dielectric paste composition (1).

Formation of Dielectric Layer

The dielectric paste composition (1) was applied onto the whole surface of a soda glass plate by the use of a bar coater, then dried at 120° C. in a hot air dryer to remove the solvent and fired at 550° C. for 10 minutes to obtain a dielectric layer having a film thickness of 50 μm.

The surface roughness Ra was measured by a stylus type surface roughness meter, and as a result, the layer had a smooth surface having a surface roughness of 0.15 μm.

Example A2

To 45 g of the binder resin solution (1), 50 g of a dielectric glass powder ($PbO$—$B_2O_3$—$SiO_2$—$CaO$ glass) and 5 g of a quartz powder were added, and they were kneaded by a three-roll mill to obtain a dielectric paste composition (2).

The dielectric paste composition (2) was applied onto the whole surface of a soda glass plate by the use of a bar coater, then dried at 120° C. in a hot air dryer to remove the solvent and fired at 550° C. for 10 minutes to obtain a dielectric layer having a film thickness of 30 μm.

The surface roughness Ra was measured by a stylus type surface roughness meter, and as a result, the layer had a smooth surface having a surface roughness of 0.10 μm.

Comparative Example A1

In a 200 ml glass separable flask, 10 g of ethyl cellulose and 90 g of N-methylpyrrolidone (available from Kanto Kagaku) as a solvent were placed, and they were stirred for 1 hour with heating to 60° C. to dissolve the resin in the solvent. Thus, a binder resin solution (2) was obtained.

To 40 g of the binder resin solution (2), 60 g of a dielectric glass powder ($PbO$—$B_2O_3$—$SiO_2$—$CaO$ glass) was added, and they were kneaded by a three-roll mill to obtain a dielectric paste composition (3).

The dielectric paste composition (3) was applied onto the whole surface of a soda glass plate by the use of a bar coater, then dried at 120° C. in a hot air dryer to remove the solvent and fired at 550° C. for 10 minutes to obtain a dielectric layer having a film thickness of 50 μm.

The surface roughness Ra was measured by a stylus type surface roughness meter, and as a result, the layer had a surface of many irregularities having a surface roughness of 1.0 μm. Because of the irregularities, the transparency was impaired. There was crazing on the surface, and lowering of pressure resistance was presumed.

As described above, in case of the paste using ethyl cellulose, the surface had many irregularities when a plasticizer was not added. In contrast therewith, a smooth surface was obtained by the use of the polyurethane resin of the invention though a plasticizer was not used.

Sealing Glass Paste Composition

Example B1

Preparation of Binder Resin Solution (3)

In a 200 ml glass separable flask, 6 g of the polyurethane resin (1) and 94 g of N-methylpyrrolidone (available from Kanto Kagaku) as a solvent were placed, and they were stirred for 30 minutes with heating to 60° C. to dissolve the resin in the solvent. Thus, a binder resin solution (3) was obtained.

Preparation of Sealing Glass Paste Composition (1)

To 10 g of the binder resin solution (3), 70 g of a $P_2O_5$—SnO—$B_2O_3$ glass and 20 g of a tin oxide powder as an inorganic filler were added, and they were kneaded by a three-roll mill to obtain a sealing glass paste composition (1).

Screen Printing

The sealing glass paste composition (1) was printed on a soda glass plate using a screen. The thickness was 100 μm. No spinnability took place, and a smooth printed surface was obtained. The paste composition thus printed was dried in air at 150° C. for 10 minutes and then fired in air at 450° C. for 10 minutes.

Gloss of Sealing Glass

After firing, gloss of a surface of the sealing glass was visually observed. As a result, the surface was glossy, and deterioration of glass was not found.

Example B2

The same sealing glass paste composition (1) as used in Example B1 was printed on a soda glass plate using a screen in the same manner as in Example B1. The paste composition thus printed was dried in air at 150° C. for 10 minutes and then fired in air at 480° C. for 10 minutes.

After firing, gloss of a surface of the sealing glass was visually observed. As a result, the surface was glossy, and deterioration of glass was not found.

Example B3

Preparation of Sealing Glass Paste Composition (2)

To 20 g of the binder resin solution (3), 40 g of a $P_2O_5$—SnO—$B_2O_3$ glass and 40 g of a tin oxide powder as an inorganic filler were added, and they were kneaded by a three-roll mill to obtain a sealing glass paste composition (2).

Screen Printing

The sealing glass paste composition (2) was printed on a soda glass plate using a screen. The thickness was 80 μm. No spinnability took place, and a smooth printed surface was obtained. The paste composition thus printed was dried in air at 150° C. for 10 minutes and then fired in air at 450° C. for 10 minutes.

Gloss of Sealing Glass

After firing, gloss of a surface of the sealing glass was visually observed. As a result, the surface was glossy, and deterioration of glass was not found.

Comparative Example B1

In 95 g of N-methylpyrrolidone, 5 g of ethyl cellulose was dissolved. To 10 g of the resulting binder resin solution, 70 g of a $P_2O_5$—SnO—$B_2O_3$ glass and 20 g of a tin oxide powder as an inorganic filler were added, and they were kneaded by a three-roll mill to obtain a sealing glass paste composition (3).

The sealing glass paste composition (3) was printed on a soda glass plate using a screen. The thickness was 110 μm. No spinnability took place, and a smooth printed surface was obtained. The paste composition thus printed was dried in air at 150° C. for 10 minutes and then fired in air at 480° C. for 10 minutes. After firing, gloss of a surface of the sealing glass was visually observed. As a result, the surface was not glossy, and deterioration of glass was found.

Comparative Example B2

In 95 g of N-methylpyrrolidone, 5 g of an acrylic resin (poly(butyl methacrylate)) was dissolved. To 10 g of the resulting binder resin solution, 70 g of a $P_2O_5$—SnO—$B_2O_3$ glass and 20 g of a tin oxide powder as an inorganic filler were added, and they were kneaded by a three-roll mill to obtain a sealing glass paste composition (4).

The sealing glass paste composition (4) was printed on a soda glass plate using a screen. The thickness was averagely 90 μm. Spinnability took place, and irregularities were found on the printed surface. The paste composition thus printed was dried in air at 150° C. for 10 minutes and then fired in air at 480° C. for 10 minutes.

After firing, gloss of a surface of the sealing glass was visually observed. As a result, the surface was glossy, and deterioration of glass was not found. However, the irregularities on the surface remained also after the firing.

In case of the paste using ethyl cellulose, deterioration of glass due to firing in air was found. In contrast therewith, in case of the sealing glass paste composition of the invention, deterioration of glass due to firing in air was not found. Further, firing was feasible even in nitrogen. This indicates that the sealing glass paste composition of the invention is easily decomposed even by firing at low temperatures or firing in air, so that the sealing glass is hardly deteriorated.

The paste composition of the invention is excellent in printing properties as well as in thermal decomposability, and the paste composition is useful as a sealing glass paste composition for IC packages.

Barrier Rib Material Paste Composition

Example C1

Synthesis of Polyurethane Resin (2)

In a 1000 ml SUS separable flask, 160 g of commercial PEG #6000 (available from Sanyo Chemical Industries, Ltd., number-average molecular weight: 8,630) and 40 g of commercial PTMEG #1000 (available from Hodogaya Chemical Co., Ltd., number-average molecular weight: 1,039) were placed, and they were melted at 150° C. under purge with nitrogen. With stirring, the melt was dried for 3 hours under reduced pressure (3 mmHg). The water content remaining was 200 ppm. The temperature was lowered down to 70° C., and the flask was filled with nitrogen at 1 atom. As an antioxidant, BHT (di-tert-butylhydroxytoluene) was added in an amount of 300 ppm. With stirring the contents in the flask, 2.00 g of the comb-shaped diol (1) and 5.07 g of hexamethylene diisocyanate (available from Tokyo Kasei Kogyo Co., Ltd.) were placed in the flask (NCO/OH=0.99 mol/mol). As a catalyst, DBTDL was added in an amount of 0.05 g, and as a result, the contents in the flask were rapidly thickened in about 10 minutes. Then, stirring was stopped, and reaction was performed at 70° C. for 2 hours. The temperature was raised to 120° C. and kept constant for 30 minutes. Then, the reaction product was taken out of the flask. The product had a weight-average molecular weight of 300,000.

The product thus taken out was cut into small chips and then allowed to cool. The chips were cooled with liquid nitrogen and pulverized by a small impact electric mill. The pulverizate was sieved to obtain a powder having particle diameters of not more than 600 μm as a binder resin (polyurethane resin (2)). The powder had an average particle diameter of 400 μm.

Preparation of Binder Resin Solution (4)

In a 200 ml glass separable flask, 20 g of the polyurethane resin (2) and 80 g of N-methylpyrrolidone (available from Kanto Kagaku) as a solvent were placed, and they were stirred for 1 hour with heating to 60° C. to dissolve the resin in the solvent. Thus, a binder resin solution (4) was obtained.

Preparation of Barrier Rib Material Paste Composition (1)

To 20 g of the binder resin solution (4), 60 g of a glass powder (PbO—B$_2$O$_3$—SiO$_2$) and 20 g of alumina were added, and they were kneaded by a three-roll mill to obtain a barrier rib material paste composition (1).

Formation of Barrier Rib

The barrier rib material paste composition (1) was applied onto the whole surface of a soda glass plate by the use of an applicator and then dried in a hot air dryer to remove the solvent, whereby a barrier rib material layer having a film thickness of 180 μm was obtained. On the layer, a dry film resist was laminated, and thereon, a light shielding film was placed, followed by light exposure and development. The unexposed portion was removed by the use of a 1% caustic soda solution. Then, sandblasting was performed for 90 seconds by a sandblasting machine using a calcium carbonate powder. When the depth given by the sandblasting was measured, it was 110 μm and was a proper depth. When the cross-sectional shape was observed, a wall surface of the barrier rib was almost flat, and over-sandblasting was not found.

Comparative Example C1

In a 200 ml glass separable flask, 20 g of ethyl cellulose and 80 g of N-methylpyrrolidone (available from Kanto Kagaku) as a solvent were placed, and they were stirred for 1 hour with heating to 60° C. to dissolve the resin in the solvent. Thus, a binder resin solution (5) was obtained.

To 20 g of the binder resin solution (5), 60 g of a glass powder (PbO—B$_2$O$_3$—SiO$_2$) and 20 g of alumina were added, and they were kneaded by a three-roll mill to obtain a barrier rib material paste composition-(2).

The barrier rib material paste composition (2) was applied onto the whole surface of a soda glass plate by the use of an applicator and then dried in a hot air dryer to remove the solvent, whereby a barrier rib material layer having a film thickness of 180 μm was obtained. On the layer, a dry film resist was laminated, and thereon, a light shielding film was placed, followed by light exposure and development. The unexposed portion was removed by the use of a 1% caustic soda solution. Then, sandblasting was performed for 90 seconds by a sandblasting machine using a calcium carbonate powder. When the depth given by the sandblasting was measured, it was 100 μm and was a proper depth. When the cross-sectional shape was observed, a center of a wall surface of the barrier rib was sandblasted too much (over-sandblasted) to form a concave.

When sandblasting was carried out to a sufficient depth by the use of the paste using ethyl cellulose, a side surface of the barrier rib was over-sandblasted, that is, the paste had a problem in the sandblasting properties. On the other hand, though sandblasting was carried out to almost the same depth by the use of the barrier rib material paste composition of the invention, a side surface of the barrier rib was not over-sandblasted, and the paste composition had excellent sandblasting properties.

Phosphor Paste Composition

Example D1

Synthesis of Polyurethane Resin (3)

In a 1000 ml SUS separable flask, 200 g of commercial PEG #6000 (available from Sanyo Chemical Industries, Ltd., number-average molecular weight: 8,630) was placed, and it was melted at 150° C. under purge with nitrogen. With stirring, the melt was dried for 3 hours under reduced pressure (3 mmHg). The water content remaining was 200 ppm. The temperature was lowered down to 70° C., and the flask was filled with nitrogen at 1 atom. As an antioxidant, BHT (di-tert-butylhydroxytoluene) was added in an amount of 300 ppm. With stirring the contents in the flask, 1.90 g of the comb-shaped diol (1) and 4.28 g of hexamethylene diisocyanate (available from Tokyo Kasei Kogyo Co., Ltd.) were placed in the flask (NCO/OH=0.95 mol/mol). As a catalyst, DBTDL was added in an amount of 0.05 g, and as a result, the contents in the flask were rapidly thickened in about 10 minutes. Then, stirring was stopped, and reaction was performed at 70° C. for 2 hours. The temperature was raised to 120° C. and kept constant for 30 minutes. Then, the reaction product was taken out of the flask. The product had a weight-average molecular weight of 290,000.

The product thus taken out was cut into small chips and then allowed to cool. The chips were cooled with liquid nitrogen and pulverized by a small impact electric mill. The pulverizate was sieved to obtain a powder having particle diameters of not more than 600 μm as a binder resin (polyurethane resin (3)). The powder had an average particle diameter of 400 μm.

Preparation of Binder Resin Solution (6)

In a 200 ml glass separable flask, 9 g of the polyurethane resin (3) and 91 g of N-methylpyrrolidone (available from Kanto Kagaku) as a solvent were placed, and they were stirred for 30 minutes with heating to 60° C. to dissolve the resin in the solvent. Thus, a binder resin solution (6) was obtained.

Preparation of Phosphor Paste Composition (1)

To 50 g of the binder resin solution (6), 50 g of a blue phosphor powder ($BaMgAl_{10}O_{17}$:Eu) was added, and they were kneaded by a three-roll mill to obtain a phosphor paste composition (1) for blue color.

Screen Printing

The phosphor paste composition (1) was printed on a soda glass plate using a screen. The thickness was 30 μm. No spinnability took place, and a smooth printed surface was obtained. The paste composition thus printed was dried at 150° C. for 10 minutes and then fired at 450° C. for 10 minutes.

Luminance of Phosphor

The phosphor was peeled off from the glass plate to recover the phosphor powder. The powder was irradiated with ultraviolet light (146 nm) to measure an intensity of emission from the phosphor. When the intensity of emission from an unfired phosphor powder was 100%, the intensity of emission from the fired phosphor was 96%.

Example D2

Synthesis of Polyurethane Resin (4)

In a 1000 ml SUS separable flask, 200 g of commercial PEG #6000 (available from Sanyo Chemical Industries, Ltd., number-average molecular weight: 8,630) was placed, and it was melted at 150° C. under purge with nitrogen. With stirring, the melt was dried for 3 hours under reduced pressure (3 mmHg). The water content remaining was 200 ppm. The temperature was lowered down to 70° C., and the flask was filled with nitrogen at 1 atom. As an antioxidant, BHT (di-tert-butylhydroxytoluene) was added in an amount of 300 ppm. With stirring the contents in the flask, 1.90 g of the comb-shaped diol (1) and 4.41 g of hexamethylene diisocyanate (available from Tokyo Kasei Kogyo Co., Ltd.) were placed in the flask (NCO/OH=0.98 mol/mol). As a catalyst, DBTDL was added in an amount of 0.05 g, and as a result, the contents in the flask were rapidly thickened in about 10 minutes. Then, stirring was stopped, and reaction was performed at 70° C. for 2 hours. The temperature was raised to 120° C. and kept constant for 30 minutes. Then, the reaction product was taken out of the flask. The product had a weight-average molecular weight of 470,000.

The product thus taken out was cut into small chips and then allowed to cool. The chips were cooled with liquid nitrogen and pulverized by a small impact electric mill. The pulverizate was sieved to obtain a powder having particle diameters of not more than 600 μm as a binder resin (polyurethane resin (4)). The powder had an average particle diameter of 400 μm.

Preparation of Binder Resin Solution (7)

In a 200 ml glass separable flask, 6 g of the polyurethane resin (4) and 94 g of N-methylpyrrolidone (available from Kanto Kagaku) as a solvent were placed, and they were stirred for 30 minutes with heating to 60° C. to dissolve the resin in the solvent. Thus, a binder resin solution (7) was obtained.

Preparation of Phosphor Paste Composition (2)

To 50 g of the binder resin solution (7), 50 g of a red phosphor powder (($Y,Gd$)$BO_3$:Eu) was added, and they were kneaded by a three-roll mill to obtain a phosphor paste composition (2) for red color.

Screen Printing

The phosphor paste composition (2) was printed on a soda glass plate using a screen. The thickness was 30 μm. No spinnability took place, and a smooth printed surface was obtained. The paste composition thus printed was dried at 150° C. for 10 minutes and then fired at 450° C. for 10 minutes.

Luminance of Phosphor

The phosphor was peeled off from the glass plate to recover the phosphor powder. The powder was irradiated with ultraviolet light (146 nm) to measure an intensity of emission from the phosphor. When the intensity of emission from an unfired phosphor powder was 100%, the intensity of emission from the fired phosphor was 95%.

Comparative Example D1

In 95 g of N-methylpyrrolidone, 5 g of ethyl cellulose was dissolved. To 50 g of the resulting solution, 50 g of a blue phosphor powder ($BaMgAl_{10}O_{17}$:Eu) was added, and they were kneaded by a three-roll mill to obtain a phosphor paste composition (3) for blue color.

The phosphor paste composition (3) was printed on a soda glass plate using a screen. The thickness was 30 μm. No spinnability took place, and a smooth printed surface was obtained. The paste composition thus printed was dried at 150° C. for 10 minutes and then fired at 500° C. for 10 minutes. The phosphor was peeled off from the glass plate to recover the phosphor powder. The powder was irradiated with ultraviolet light (146 nm) to measure an intensity of emission from the phosphor. When the intensity of emission from an unfired phosphor powder was 100%, the intensity of emission from the fired phosphor was 80%.

In case of the paste using ethyl cellulose, the relative intensity of emission was 80% after firing at 500° C. On the other hand, in case of the phosphor paste composition of the invention, the relative intensity of emission was not less than 95% after firing at 450° C. This indicates that the phosphor paste composition of the invention is hardly carbonized even by low-temperature firing, so that the luminance of the phosphor is hardly lowered.

INDUSTRIAL APPLICABILITY

The paste composition of the invention can be employed for the formation of a dielectric layer of PDP (plasma display panel), the formation of a sealing glass layer of PDP, the formation of a barrier rib material layer of PDP and the formation of a phosphor layer of PDP. The paste composition of the invention is useful as a paste composition for displays.

The invention claimed is:

1. A paste composition comprising:
   (i) a polyurethane resin which comprises:
      (a) a recurring unit represented by the following formula (1):

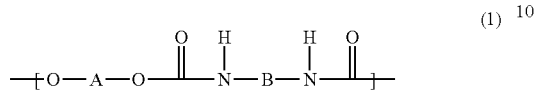

wherein A is a group (divalent group) given by removing OH groups from a polyoxyalkylene glycol (compound A) HO-A-OH having hydroxyl groups on both terminals thereof, and B is a group (divalent group) given by removing NCO groups from a diisocyanate (compound B) OCN—B—NCO, and
      (b) a recurring unit represented by the following formula (2):

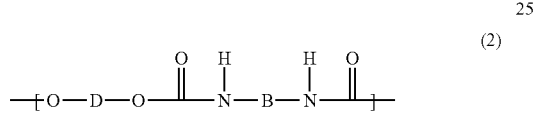

wherein D is a group (divalent group) given by removing OH groups from a comb-shaped diol HO-D-OH having at least two hydrocarbon groups (monovalent groups) of 4 to 21 carbon atoms in a molecule, and B is a group (divalent group) given by removing NCO groups from a diisocyanate (compound B) OCN—B—NCO,
   said polyurethane resin having a molar fraction of the recurring unit (a) from 0.35 to 0.99 and a molar fraction of the recurring unit (b) from 0.01 to 0.65, with the proviso that the total of both the molar fractions is 1,
   (ii) a solvent, and
   (iii) a powder selected from the group consisting of a low-melting point glass powder and a phosphor powder.

2. The paste composition as claimed in claim 1, wherein the comb-shaped diol HO-D-OH is a comb-shaped diol (compound D) represented by the following formula (3):

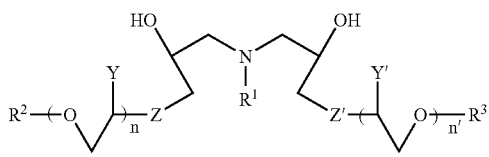

wherein $R^1$ is a hydrocarbon or nitrogen-containing hydrocarbon group of 1 to 20 carbon atoms, $R^2$ and $R^3$ are each a hydrocarbon group of 4 to 21 carbon atoms, a part or all of hydrogen atoms in $R^1$, $R^2$ and $R^3$ may be replaced with fluorine, chlorine, bromine or iodine, and $R^2$ and $R^3$ may be the same or different,
   Y and Y' are each hydrogen, a methyl group or a $CH_2Cl$ group, and Y and Y' may be the same or different,
   Z and Z' are each oxygen, sulfur or a $CH_2$ group, and Z and Z' may be the same or different,
   when Z is oxygen, n is an integer of 0 to 15, and when Z is sulfur or a $CH_2$ group, n is 0, and
   when Z' is oxygen, n' is an integer of 0 to 15, when Z' is sulfur or a $CH_2$ group, n' is 0, and n and n' may be the same or different;
or
a comb-shaped diol (compound D') represented by the following formula (4):

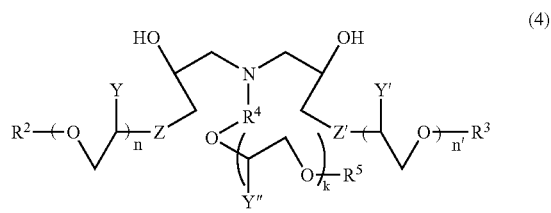

wherein $R^5$ is a hydrocarbon group of 1 to 20 carbon atoms, $R^2$ and $R^3$ are each a hydrocarbon group of 4 to 21 carbon atoms, a part or all of hydrogen atoms in $R^5$, $R^2$ and $R^3$ may be replaced with fluorine, chlorine, bromine or iodine, and $R^2$ and $R^3$ may be the same or different,
   Y, Y' and Y" are each hydrogen, a methyl group or a $CH_2Cl$ group, and Y and Y' may be the same or different,
   Z and Z' are each oxygen, sulfur or a $CH_2$ group, and Z and Z' may be the same or different,
   —$R^4$ is an alkylene group having 2 to 4 carbon atoms in all,
   k is an integer of 0 to 15,
   when Z is oxygen, n is an integer of 0 to 15, and when Z is sulfur or a $CH_2$ group, n is 0, and
   when Z' is oxygen, n' is an integer of 0 to 15, when Z' is sulfur or a $CH_2$ group, n' is 0, and n and n' may be the same or different.

3. The paste composition as claimed in claim 1, wherein the powder (iii) is the low-melting point glass powder.

4. The paste composition as claimed in claim 3, which further comprises an inorganic filler (except the low-melting point glass powder) as the powder (iii).

5. The paste composition as claimed in claim 1, wherein the powder (iii) is the phosphor powder.

6. The paste composition as claimed in claim 3, wherein the low-melting point glass powder is a dielectric glass powder.

7. The paste composition as claimed in claim 3, wherein the low-melting point glass powder is a sealing glass powder.

8. The paste composition as claimed in claim 3, wherein the low-melting point glass powder is a barrier rib material glass powder.

9. A dielectric layer formed from the paste composition of claim 3.

10. A sealed product formed from the paste composition of claim 3.

11. A barrier rib formed from the paste composition of claim 3.

12. A phosphor formed from the paste composition of claim 5.

13. A process for producing a dielectric layer, comprising applying or printing the paste composition of claim 3 on a substrate and then firing the paste composition.

14. A process for producing a sealed product, comprising applying or printing the paste composition of claim 3 on a substrate and then firing the paste composition.

15. A process for producing a barrier rib, comprising applying or printing the paste composition of claim 3 on a substrate and then firing the paste composition.

16. A process for producing a phosphor, comprising applying or printing the paste composition of claim 5 on a substrate and then firing the paste composition.

* * * * *